Sept. 6, 1966  E. M. KARKAR  3,271,705
ELECTRIC WAVE FILTER
Filed Oct. 6, 1961  4 Sheets-Sheet 1
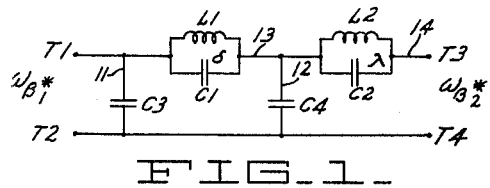
FIG_1_
$$\omega_\beta^* = \frac{a^2 \sqrt{p^2+1}}{p^2+a^2}$$
$p = \delta \frac{\omega}{\omega_0} \quad a = \frac{\omega_a}{\omega_c} \quad m = \sqrt{1-\frac{1}{a^2}}$
$a = 1.25 \quad m = 0.6$
FIG_2_
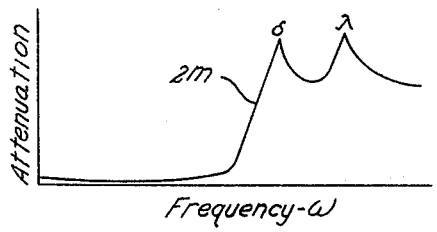
FIG_3_
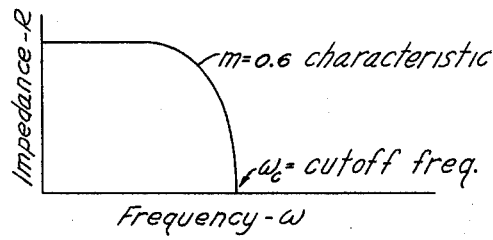
FIG_4_
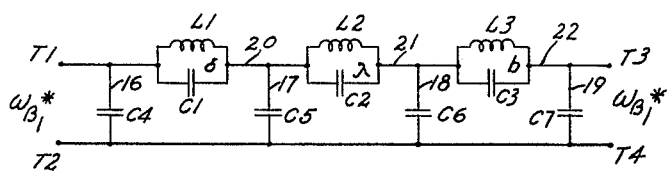
FIG_5_
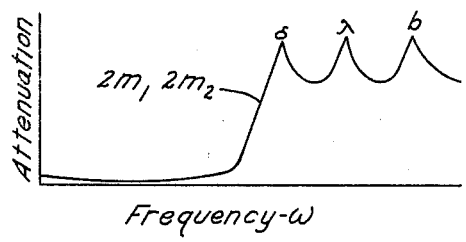
FIG_6_
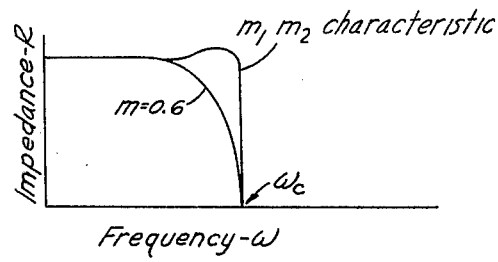
FIG_7_
INVENTOR.
Edward M. Karkar
BY
ATTORNEYS.

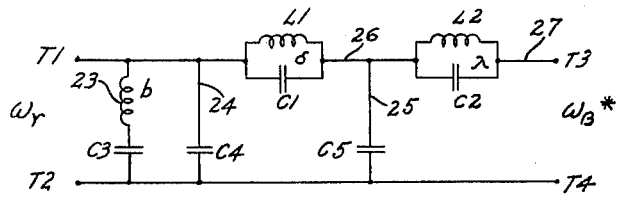

FIG_8_

$$\omega_r = \mu \frac{p^2 + a^2}{(p^2+\beta^2)\sqrt{p^2+1}} \qquad \mu_0 = \frac{\beta^2}{a^2}$$

FIG_9_

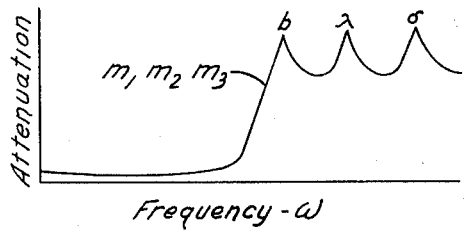

FIG_10_

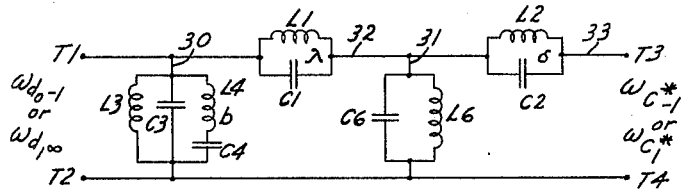

FIG_11_

$$\omega_{d_{0-1}} = \mu \frac{p^2+a'^2}{p(p^2+\beta'^2)} \sqrt{\frac{p^2+m_0^{-2}}{p^2+m_0^2}} \qquad \mu_0 = \frac{m_0(\beta'^2-1)}{a'^2-1}$$

$$\omega_{d_{1\infty}} = \mu \frac{p(p^2+a^2)}{p^2+\beta^2} \sqrt{\frac{p^2+m_0^2}{p^2+m_0^{-2}}} \qquad \mu_0 = \frac{1-\beta^2}{m_0(1-a^2)}$$

$$\omega_{C_1}^* = m_0(1-a^2) \frac{p}{p^2+a^2} \sqrt{\frac{p^2+m_0^{-2}}{p^2+m_0^2}}$$

$$\omega_{C-1}^* = \mu_1 \frac{p}{p^2+a'^2} \sqrt{\frac{p^2+m_0^2}{p^2+m_0^{-2}}}$$

$$m_0 = \sqrt{\frac{\omega_2}{\omega_1}}$$

FIG_12_

Sept. 6, 1966  E. M. KARKAR  3,271,705
ELECTRIC WAVE FILTER
Filed Oct. 6, 1961  4 Sheets-Sheet 3
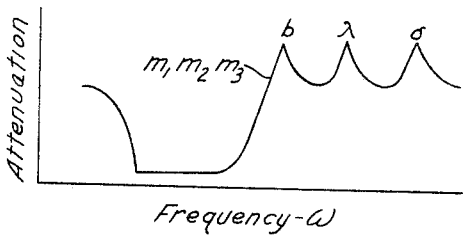
FIG_13A_
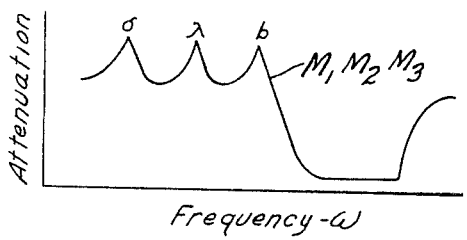
FIG_13B_
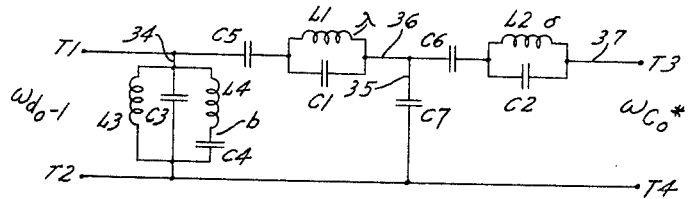
FIG_14_
$$\omega_{c_0}^* = \mu_2 \frac{\sqrt{(p^2+m_0^{-2})(p^2+m_0^2)}}{p(p^2+\Omega_\infty'^2)}$$
$$\mu_2 = \frac{\Omega_\infty'^2 - m_0^{-2}}{m_0^2 - m_0^{-2}} \qquad \Omega_\infty = \frac{\omega_\infty}{\omega_0}$$
FIG_15_
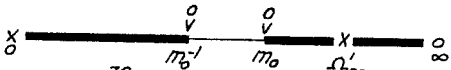
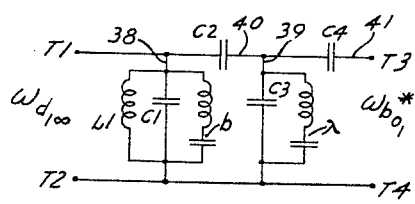
FIG_16_
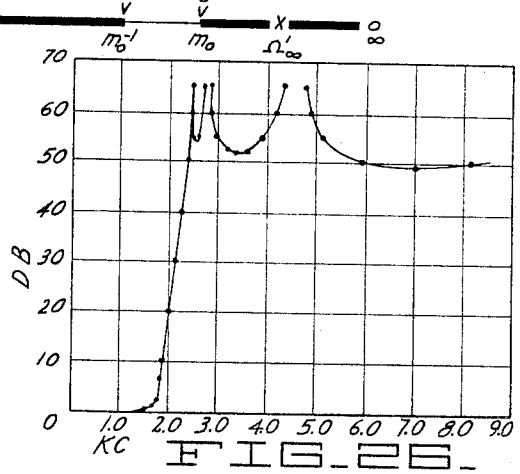
FIG_26_
$$\omega_{b_{0_1}}^* = \mu_1 \frac{1}{p} \sqrt{\frac{p^2+m_0^{-2}}{p^2+m_0^2}} \qquad \mu_1 = 1$$
FIG_17_
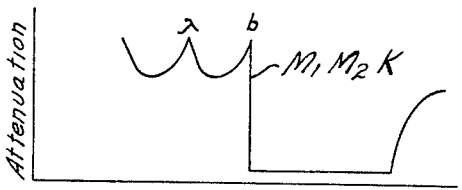
FIG_18_
INVENTOR.
Edward M. Karkar
BY
ATTORNEYS.

Sept. 6, 1966   E. M. KARKAR   3,271,705
ELECTRIC WAVE FILTER
Filed Oct. 6, 1961   4 Sheets-Sheet 4
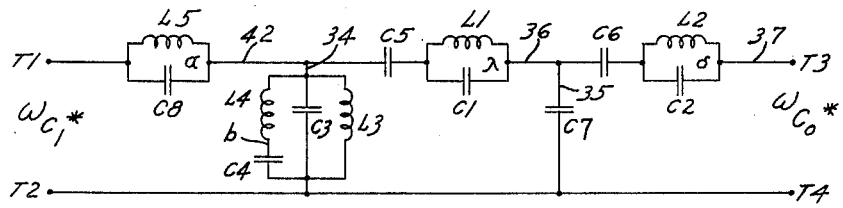
FIG.19.
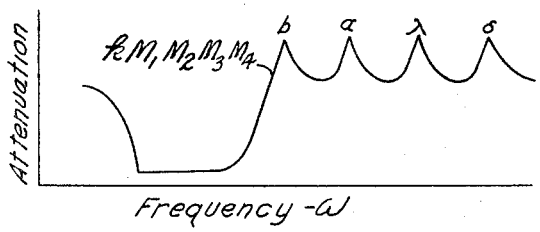
FIG.20.
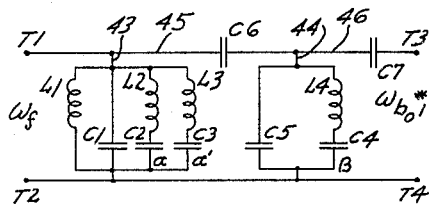
FIG.21.
$$\omega_f = \mu_0 \frac{p(p^2+\alpha^2)(p^2+\alpha'^2)}{(p^2+\beta^2)(p^2+\beta'^2)\sqrt{(p^2+m_0^{-2})(p^2+m_0^2)}}$$
$$\mu_0 = \frac{(\beta'^2-1)(1-\beta^2)}{(\alpha'^2-1)(1-\alpha^2)}(m_0-m_0^{-1})$$
FIG.22.
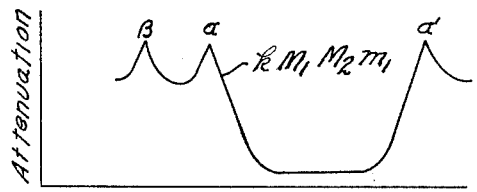
FIG.23.
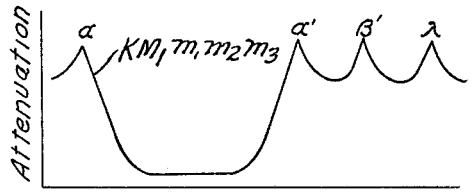
FIG.25.
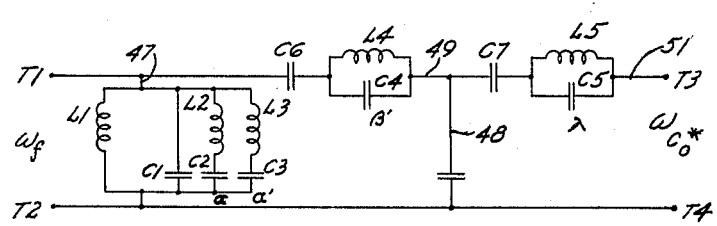
FIG.24.
INVENTOR.
Edward M. Karkar
BY
ATTORNEYS.

United States Patent Office 3,271,705
Patented Sept. 6, 1966

3,271,705
ELECTRIC WAVE FILTER
Edward M. Karkar, San Francisco, Calif., assignor, by mesne assignments, to Communication Equipment Design, Inc., Reno, Nev., a corporation of Nevada
Filed Oct. 6, 1961, Ser. No. 143,371
14 Claims. (Cl. 333—76)

This invention relates to electric wave filters and more particularly to electric wave filters which are particularly adapted for the selection of bands of frequencies in communication systems.

It has been the present day practice in developing filters to meet certain prescribed requirements to first choose a suitable impedance equation and then derive a filter network from it. According to existing techniques, there is a very limited choice in the selection of conjugate impedance equations. Also, the resulting image impedance characteristics on both ends of the filter are often unsuitable for use as terminating impedances, making it necessary to either add extra sections or half sections for impedance matching purposes, or to create an average mismatch over the pass band of the filter which is better known as the equi-ripple or the Tchebycheff pass band response. The amount of stop band rejection is proportional to the value of the mismatch in the pass band. This mismatch causes ripples which, in turn, create phase irregularities to make such filters unsuitable for data transmission applications. Also, such filters are very sensitive to the tolerances of the elements used in the filter. The foregoing techniques were originated by Zobel, Cauer and Darlington, well known to those skilled in the art of electric wave filters. As is also well known to those skilled in the art, such filters utilizing crystals have serious limitations because crystals are utilized. For example, certain impedance points created by the crystals must be compensated for by other resonators. Also, in such filters, an unduly large number of elements is often required in order to achieve the desired results. There is, therefore, a need for a new and improved electric wave filter.

In general, it is an object of the present invention to provide a new and improved electric wave filter which overcomes the above named disadvantages.

Another object of the invention is to provide an electric wave filter of the above character which has attenuation peaks which are completely independent of the image impedance functions within the pass band and with respect to their location from the cutoff frequency and from each other without creating ripple within the pass band or attenuation discontinuities in the stop band.

Another object of the invention is to provide an electric wave filter of the above character in which minor variations in the tolerances of the elements used in the filter do not affect the characteristics of the filter.

Another object of the invention is to provide an electric wave filter of the above character which has matched terminations and which is independent of the $m=0.6$ or $m_1m_2$ terminating sections without creating mismatch ripples over the pass band.

Another object of the invention is to provide an electric wave filter of the above character in which no attenuation peak is required to provide an image impedance in the pass band in the locations of $m=0.6$ or $a=1.25$.

Another object of the invention is to provide an electric wave filter of the above character in which poles and zeros in different arms are independent of one another.

Another object of the invention is to provide an electric wave filter of the above character in which each attenuation peak is at a different frequency.

Another object of the invention is to provide an electric wave filter of the above character in which the components used have values and sizes which are readily available.

Another object of the invention is to provide an electric wave filter of the above character in which low cost components can be utilized while still retaining the desired response over a wide range of temperature and over a long aging period.

Another object of the invention is to provide an electric wave filter of the above character which has low phase distortion and correspondingly low group delay distortion.

Another object of the invention is to provide an electric wave filter of the above character which has low phase and attenuation deterioration with respect to the tolerances of the components used.

Another object of the invention is to provide an electric wave filter of the above character in which conventional LC components can be replaced by mechanical resonators without limiting the spread of the attenuation peaks and without the addition of excessive compensating resonators.

Additional objects and features of the invention will appear from the following description in which the preferred embodiments are set forth in detail in conjunction with the accompanying drawings.

Referring to the drawings:

FIGURE 1 is a circuit diagram of a basic form low pass filter section incorporating my invention.

FIGURE 2 shows the equation for the input and output image impedances.

FIGURES 3 and 4 are curves showing the attenuation and impedance characteristics, respectively, of the filter shown in FIGURE 1.

FIGURE 5 is a circuit diagram of a complete seven-arm filter.

FIGURES 6 and 7 are the attenuation and image impedance curves ($m=0.6$), respectively, for the filter sections shown in FIG. 5.

FIGURE 8 is a circuit diagram of another four-arm filter section.

FIGURE 9 gives the equation for input image impedance of the filter section shown in FIG. 8.

FIGURE 10 is the attenuation curve for the filter section as shown in FIG. 8.

FIGURE 11 is a circuit diagram of a band pass filter.

FIGURE 12 gives the equations for the input and output image impedances of the filter section shown in FIG. 11.

FIGURES 13A and 13B show the attenuation response curves for the different image impedances of the filter circuit shown in FIG. 11.

FIGURE 14 is a circuit diagram of another four-arm filter section.

FIGURE 15 gives the equation for the output image impedance of the filter section in FIG. 14.

FIGURE 16 is a circuit diagram of another four-arm filter section.

FIGURE 17 gives the equation for the output image impedance of the filter section shown in FIG. 16.

FIGURE 18 shows the attenuation response of the filter section shown in FIG. 16.

FIGURE 19 is a circuit diagram of a five-arm filter section.

FIGURE 20 is a curve showing the attenuation response of the filter section shown in FIG. 19.

FIGURE 21 is a circuit diagram of another four-arm filter section.

FIGURE 22 gives the input image impedance of the filter section shown in FIG. 21.

FIGURE 23 shows a curve giving the attenuation response of the filter section shown in FIGURE 21.

FIGURE 24 is a circuit diagram of another four-arm filter section.

FIGURE 25 shows a curve giving the attenuation response of the filter section shown in FIGURE 24.

FIGURE 26 is a curve showing the exact attenuation of a filter constructed in accordance with the filter shown in FIGURE 5.

In general, my electric wave filter consists of at least four impedance arms arranged in a ladder type configuration to provide a filter having a pass band and stop band. The impedance arms form at least two resonances which provide at least two points of high attenuation in the stop band. The attenuation response of the filter is independent of the poles and zeros defined by the equations for the input and output image impedances for the filter.

Referring to the drawings, in FIGURE 1, I have shown a basic four-arm low-pass filter section incorporating my invention. It is provided with input terminals T1 and T2 and output terminals T3 and T4. It consists of shunt arms 11 and 12 and series arms 13 and 14. The series arm 13 includes a parallel tuned circuit δ which consists of a capacitor C1 and a coil or inductor L1. The series arm 14 includes a parallel tuned circuit λ consisting of a capacitor C2 and inductor L2 as shown. The shunt arms 11 and 12 consist of capacitors C3 and C4, respectively.

The filter section shown in FIGURE 1 has an input image impedance at terminals T1 and T2 of class $\omega\beta^*_1$ and an output image impedance at terminals T3 and T4 of class $\omega\beta^*_2$. Throughout the description of my invention, I will utilize a notation of this type to indicate the input and output image impedances. This type of notation is well known to those skilled in the art and is normally called the Cauer notation for image impedances. In this notation system $M_1$ represents the attenuation function below the pass band of the $m$ type filter and K represents a similar function for the $k$ type filter. $m_1$ represents the attenuation function above the pass band for the $m$ type filter and $k$ represents the similar function for the constant $k$ type filter.

FIGURE 2 shows the equation for the image impedance class $\omega\beta^*$. In the equation P equals the normalized frequency parameter, normalized with respect to the cut-off frequency $\omega_c$. $\omega$ is any chosen frequency. $\omega_0 = \omega_c$ in a low pass filter. In a band pass filter $\omega_0 = \sqrt{\omega_{C_1}\omega_{C_2}}$ where $\omega_{C_1}$ and $\omega_{C_2}$ are the lower and upper cut-off frequencies, respectively. Also shown in FIGURE 2 is a plot showing the pass band and the attenuated band. The thin lines represent the pass band, whereas the solid lines indicate the attenuated band. The cut-off frequency is indicated by the sign $\nu$. Circles and crosses respectively represent the zeros and poles. Thus, the plot in FIGURE 2 shows the branching point or cut-off point of the filter and its type pole or zero, and the points of infinite impedances and zero impedances. In other words, the branching point is the corner of the filter and indicates the point at which branching of the attenuation response curve from the pass band to the stop band occurs. As shown in the plot, there are poles and zeros, a zero impedance point at $\infty$, and there is a pole at $a$.

In FIGURE 3, I have shown the attenuation response of the filter section shown in FIGURE 1. The attenuation is of class 2M1 and has two peaks at δ and λ as indicated. Neither of these peaks is located at $a=1.25$ or at $m=0.6$. For that reason, it is possible to provide perfect matching at terminals T1 and T2 without the necessity of providing an extra section forming another attenuation peak which previously has been required under techniques developed by Zobel. The basic filter section which is called the mid-series derived filter section of Zobel has image impedances of $a$ and $\beta^*$. The characteristic of $\omega\beta^*$ image impedance of the second degree is essential in order to obtain perfect matching. For $\omega\beta^*$, the parameters of $a$ and $m$ must equal 1.25 and 0.6 respectively to provide good impedance matching in the pass band.

On the other side of the filter section shown in FIGURE 1 or at terminals T3 and T4, the output impedance is $\omega\beta^*_2$. The $\alpha$ in $\beta^*_2$ is not equal to the $\alpha$ in $\beta^*_1$ and for this reason, this section is only matched at the terminals T1 and T2. As hereinafter explained to have matched input and output terminals, it is necessary to provide an additional filter section similar to that shown in FIGURE 1.

In each of my filter sections, at least four arms and two tuned circuits are provided to obtain the desired perfect matching in the pass band. These tuned circuits provide at least two points of high attenuation in the stop band in which none of these points are located at $m=0.6$ or at $a=1.25$. In the past, it has been necessary to provide two additional tuned circuits, one on each terminal of the filter for impedance matching purposes in accordance with the image parameter theory based upon the work of Zobel. Also, in accordance with the work of Cauer and Darlington (see "Synthesis of Linear Communication Networks" by Wilhelm Cauer, second edition, McGraw-Hill Book Co., pages 765–809; and "Synthesis of Reactance 4-Poles Which Produce Prescribed Insertion Loss Characteristics," J. Math. Phys., vol. 13, pp. 257–353, September 1939), it has been necessary to permit a ripple response in the pass band in order to eliminate the requirement for two extra tuned circuits. In my filter sections, there are no additional tuned circuits and no such attenuation ripple response. In previous filters, such as those shown in Figures 2 and 3 on page 182, Figure 4 on page 191 and Figure 18 on page 211 of "Reference Data for Radio Engineers," fourth edition, International Telephone and Telegraph Corp., 320 Park Avenue, New York, the ripples in the pass band and the extent and size of these ripples are directly proportional to the amount of attenuation that is provided in the stop band. For every ripple in the pass band there are: an impedance mismatch, a deviation in the phase behavior at the location of the ripple and a corresponding group delay distortion. Also, the ripples in the pass band, their location and their value are dependent upon the tolerances of the component values and their ratios. Therefore, with components having greater tolerances, there are larger ripples which very often appear in different places of the pass band than their originally designed location. These defects are even more prominent in actual practice where filters usually face circuits with non-linear impedances such as modulators. With my circuitry, therefore, components with wider tolerances can be used because no ripples appear in the pass band.

The impedance behavior over the pass band of the basic low pass filter which is shown in FIGURE 1 is shown in FIGURE 4 with a class B type image impedance where $m=0.6$. The impedance in the pass band is substantially resistive. The attenuation response, as shown in FIGURE 2 in the pass band, is flat with a minimum corner and minimum reflectivity. Zobel has established that for image parameter filters, two filter termination sections with attenuation peaks located at $m=0.6$ must be used to provide regular and resistive impedances in a large portion of the pass band. Correspondingly, such image impedance functions with $m=0.6$ require that the attenuation function provides an attenuation peak at $m=0.6$. Thus, in the filter section shown in FIGURE 1, it is possible to eliminate one resonant circuit and still attain the desired impedance of $\omega\beta^*_1$ with $m=0.6$. In addition, it is possible to locate the two peaks δ and λ where desired without one of the peaks having to be at $m=0.6$ as would be required by Zobel's approach. It, therefore, can be seen that the attenuation response is independent of the poles and zeros defined by the equations for the input and output image impedances.

In FIGURE 5, I have shown a filter which consists of a minimum of 7 arms, 16–22, with the arms 16–19 being shunt arms and arms 20–22 being series arms. The arms are formed of inductors and capacitors as shown which are identified in a manner similar to the filter section shown in FIGURE 1. The series arms 20–22 are provided with three parallel tuned circuits identified δ, λ and b, respectively. By comparing FIGURES 1 and 5, it can be seen that FIGURE 5 is comprised of two of the filter sections shown in FIGURE 1 with the arm 21 containing the λ tuned circuit comprising the common arm for the two filter sections. Thus, in effect, there are four tuned circuits provided in the filter section shown in FIGURE 5 with the λ section being the common tuned circuit. The large impedances are $\omega\beta^{*}_{1}$ for both ends of the filter.

As can be seen from the attenuation response curve shown in FIGURE 6, the low pass filter shown in FIGURE 5 provides three attenuation peaks δ, λ, b in which none of the peaks are located at $m=0.6$ or $a=1.25$. Therefore, it is possible to derive such a filter section without providing two extra matching sections for providing the desired attenuation for such a filter.

In FIGURE 7, I have shown a plot of impedance vs. frequency for the impedance class of $m_1m_2$ and for $m=0.6$. To obtain such resistive terminations over wider portions of the pass band, higher order image impedance equations are required and, therefore, a greater number of elements are necessary. It is further necessary that a certain relationship or spread between $m_1m_2$ be maintained which makes impractical and uneconomical the use of a combination of half sections of this type for terminating purposes. Heretofore, it has been the approach to first envision portions of a complicated ladder filter as individual sections and then connect them in tandem. The facing ends of the sections so connected must have the same impedance class. This requires additional tuned circuits or components which do not substantially contribute to the attenuation behavior of the filter. For certain sections in the center of the filter, which conform to attenuation requirements, the image impedance function cannot be arbitrarily chosen. A high number of components are required to compensate for unwanted impedance points in the stop band to create the type of image impedance function chosen. These additional attenuation peaks must meet the requirement of having a certain frequency spread between them which not only complicates the filter configuration but also causes deterioration of the performance of the filter and, therefore, often makes it impractical.

In FIGURE 8 is shown another filter section which consists of five arms 23–27 in which arms 23, 24 and 25 are shunt arms and arms 26 and 27 are series arms. The arm 23 is provided with a series tuned circuit identified as b and arms 26 and 27 are provided with parallel tuned circuits which are identified as δ and λ respectivtly. This filter section in FIGURE 8 makes it possible to obtain better impedance matching. This can be seen from FIGURE 7, in which it is shown that it is possible to obtain a wider and more resistive pass band than when m is equal to 0.6. However, with the arrangement shown in FIGURE 8, $m_1m_2$ must be closely associated parameters. For example, if a is equal to 1.02 for $m_1$ then b must be 1.23 for $m_2$ to obtain perfect matching. These figures are obtained from tables which are set by standards determined by Zobel. However, with my filter section, it is possible to obtain complete freedom in placing of the attenuation peaks β, λ and δ while at the same time retaining the desired impedance characteristics. The equation for the input image impedance and its plot is shown in FIGURE 9.

In FIGURE 11 is shown a filter section which serves as a band pass filter. The filter section shown in FIGURE 11 has four arms 30–33 which arms 30 and 31 are shunt arms and arms 32 and 33 are series arms. The shunt arm 30 includes a series tuned circuit b. The series arm 32 includes a parallel tuned circuit λ and the series arm 33 includes a parallel tuned circuit δ.

As hereinbefore explained, by using four arms it is possible to eliminate any dependence on the poles and zeros as described by the input and output image impedances. As shown in FIGURE 12, the plot of the input image impedance has a zero at $a'$ and a pole at $\beta'$. Normally, these would have to be compensated for by the use of another tuned circuit which, according to the teaching in the prior art, should be located in an adjacent series or shunt arm. However, with my filter circuit, it is unnecessary to provide a compensating resonant circuit for the unwanted pole at $\beta'$. This has been accomplished by generating the four arm filter network shown in FIGURE 11 as a complete entity which cannot be divided into several two-arm networks or three-arm networks.

As explained previously, the attenuation curve for the filter section in FIGURE 11 is shown in FIGURES 13A and 13B in which the three peaks are located either above or below the pass band. However, it should be pointed out that it is not necessary to have all three attenuation points on one side of the pass band. For example, if desired, it is possible to design the filter section so that one of the peaks is on one side of the pass band and two of the peaks are on the other side of the pass band. This merely depends upon the attenuation class chosen. For example, with one peak below the pass band and two peaks above the pass band, the attenuation function is $m_1M_2M_3$. Heretofore, such a rearrangement has not been possible in designing filter sections for the same impedance classes as shown in FIGURE 12.

Thus, it can be seen that it is possible to design the filter sections with attenuation peaks independent of the location of the poles and zeros of the image impedance functions. Therefore, it is possible to retain the desired image impedance functions and then arbitrarily choose the location of the peak attenuation required. These desirable features have been made possible because I have derived complete filters or filter sections which have at least four arms.

In FIGURE 14, I have shown another filter section. It is provided with four arms 34, 35, 36 and 37 with arms 34 and 35 being shunt arms and arms 36 and 37 being series arms. The image impedances on the input and output terminals are as shown. The attenuation function is $km_1m_2m_3$.

The primary advantage of the filter section shown in FIGURE 14 over the filter section shown in FIGURE 11 is that it provides an extra k attenuation function and in that it requires one less coil in the shunt arm 35. However, it does include an additional capacitor C5 in the series arm 36 and an additional capacitor C6 in the series arm 37. However, since capacitors are normally cheaper than coils, the filter section shown in FIGURE 14 is more economical than that shown in FIGURE 11.

The filter section shown in FIGURE 14 also differs from that in FIGURE 11 in that the image impedance at terminals T3 and T4 is $C_0^*$. The equation and the plot for this image impedance is shown in FIGURE 15. In the equations $\Omega_n$ is the normalized frequency parameter for the filter.

Another filter section is shown in FIGURE 16 and consists of four arms 38–41 in which arms 38 and 39 are shunt arms and arms 40 and 41 are series arms. The image impedances are as indicated on the drawing. The equation and the plot of the image impedance on the output terminals T3 and T4 is shown in FIGURE 17. The filter section has an attenuation class of $M_1M_2K$ to provide peaks at b and λ which are located on the lower side of the pass band as shown in FIGURE 18.

This filter section as shown in FIGURE 16 also has fewer coils than the filter section shown in FIGURE 11 and a different image impedance at the output terminals T3 and T4 which may be particularly desirable in certain applications.

If desired, additional standard type filter sections can be provided in tandem with my filter sections to provide additional attentuation peaks outside of the pass band.

Thus, I have shown in FIGURE 19 a filter which has a filter section of the type shown in FIGURE 14 used in tandem with a known filter section. For that reason, all of the arms which are a part of the filter section shown in FIGURE 14 carry the same numbers in FIGURE 19. The additional filter consists of an arm 42 which includes a parallel tuned circuit as shown. The input and output image impedances are shown in the drawing. The plot of attenuation versus frequency is shown in FIGURE 20 of the drawings and shows that four attenuation peaks are provided above the high end of the pass band. This is attenuation class $M_1M_2M_3M_4k$.

From the foregoing filter sections, it can be seen that the attentuation peaks are spaced frequency-wise. There are no peaks which lie one on top of the other.

If desired, certain of the peaks which are provided on the high side of the pass band can be located on the low side of the pass band by making relatively simple modifications of the circuit shown in FIGURE 19. For example, it is only necessary to change from a parallel tuned circuit in the series arm to a series tuned circuit in a shunt arm and other vice versa.

In FIGURE 21, I have shown another four-arm filter section consisting of shunt arms 43 and 44 and series arms 45 and 46. The filter section has the image impedance as shown. The filter section shown in FIGURE 21 is provided with two series tuned circuits $a$ and $a'$ in the shunt arm 43 and a series tuned circuit $\beta$ provided in shunt arm 44. The input image impedance has a higher class and is better known as a double-$m$ derived image impedance in accordance with Zobel. The equation and plot for this image impedance is shown in FIGURE 22.

The filter section shown in FIGURE 21 is advantageous in that it utilizes fewer coils and capacitors and reduces the number of resonances required to obtain the image impedance $\omega_f$. Thus, as shown in FIGURE 21, it is unnecessary to have any tuned circuit in the series arms to compensate for any unwanted impedance points. The attenuation response of the filter section in FIGURE 21 is shown in FIGURE 23 and shows two peaks $\beta$ and $a$ on the lower side of the pass band and peak $a'$ on the high side of the pass band. The attenuation response is $kM_1M_2m_1$ as shown.

Another four-arm filter section is shown in FIGURE 24 and consists of shunt arms 47 and 48 and series arms 49 and 51. The shunt arm 47 is provided with two series tuned circuits $a$ and $a'$, whereas the series arms 49 and 51 are provided with parallel tuned circuits $\beta'$ and $\lambda$, respectively. The image impedances for the input and output terminals are shown in the drawings. The attenuation function is class $K\ M_1m_1m_2m_3$ as shown in FIGURE 25.

Although I have shown all of my filter sections as being without crystals, it should be pointed out that crystals can be used wherever desired. They can be used in any desired location to replace any LC combination. It is feasible to use low cost crystals because it is possible to use high impedance crystals with high $C_o/c$ ratios which heretofore has not been practical. The crystals need not be of high quality since it is unnecessary to compensate for unwanted resonances.

By way of example, one embodiment constructed in accordance with FIGURE 5 had the following component values:

L1 = 118.53 millihenries  
L2 = 117.47 millihenries  
L3 = 80.52 millihenries  
C1 = .010553 microfarads  
C2 = .03855 microfarads  
C3 = .0378338 microfarads  
C4 = .048648 microfarads  
C5 = .127424 microfarads  
C6 = .120529 microfarads  
C7 = .028308 microfarads For the above component values, the points of infinite attenuation are located at the following frequencies:

$$f_{\infty_1} = 4.5 \text{ kc.} \quad \Omega_{\infty_1} = \frac{\omega_{\infty_1}}{\omega_o} = 2.586$$

$$f_{\infty_2} = 2.365 \text{ kc.} \quad \Omega_{\infty_2} = \frac{\omega_{\infty_2}}{\omega_o} = 1.359$$

$$f_{\infty_3} = 2.750 \text{ kc.} \quad \Omega_{\infty_3} = \frac{\omega_{\infty_3}}{\omega_o}$$

where $f_c = 1.740$ kc. (cut-off frequency) and  
$\omega = 2\pi f$

A curve showing the attenuation response of this particular filter is shown in FIGURE 26.

It is apparent from the foregoing that I have provided a radically different electric filter in which it is possible to retain the desired image impedance functions while choosing an arbitrary attenuation function. There is, therefore, no need for a close relationship between the attenuation peaks and their location.

I claim:

1. In an electric wave filter of the type having a pass band and a stop band, said electric wave filter comprising at least seven impedance arms which are the synthesis of at least a pair of matched indivisible four arm sections characterized by one resonant circuit common to both sections, said filter having two input terminals and two output terminals with predetermined input and output image impedance functions in the pass band, the input and output image impedance functions being capable of being expressed in equations containing poles and zeros where the zeros are the points where the function equals zero and the poles are the points where the function equals infinity, the filter also having a predetermined attenuation function in the stop band, the attenuation function being capable of being expressed in an equation containing poles and zeros, the filter also having a predetermined cut-off frequency, the filter having at least three tuned circuits forming at least three tuned resonances, the resonances of the tuned circuits providing at least three attenuation poles in the stop band, said attenuation poles being arbitrarily positioned with respect to the poles and zeros defined by the equations of both the input and output image impedance functions of the filter, said attenuation poles also being positioned arbitrarily with respect to the cut-off frequency of the filter and with respect to each other, said filter and pass band having a substantially flat and rippleless attenuation characteristic, a substantially linear and rippleless phase and group delay characteristic, and a substantially resistive image impedance characteristic.

2. A filter as in claim 1 wherein said high attenuation poles are spaced from the points where $\alpha = 1.25$ corresponding to $m = 0.6$ where $m = \sqrt{1 - 1/\alpha^2}$ and $\alpha = \omega_a/\omega_c$ and where $\omega_a$ = any chosen frequency in the stop band and where $\omega_c$ = the cut-off frequency of the filter.

3. A filter as in claim 2 wherein said points of high attenuation are all provided above the pass band to reject frequencies above the pass band.

4. A filter as in claim 1 wherein the points of high attenuation are below the pass band to reject all the frequencies below the pass band.

5. A filter as in claim 1 wherein the points of high attenuation are positioned above and below the pass band to reject frequencies above and below the pass band.

6. A filter as in claim 1 in which at least one four arm indivisible filter section has an attenuation class of $2m$ and an input image impedance of $\omega_{\beta_1}*$ and an output image impedance of $\omega_{\beta_2}*$.

7. A filter as in claim 1 in which at least one four arm indivisible filter section has an attenuation of class $m_1m_2m_3$ and has an input image impedance of $\omega_\nu$ and an output image impedance of $\omega_\beta*$.

8. A filter as in claim 1 in which at least one four arm indivisible filter section has an attenuation of class $m_1m_2m_3$ and an input image impedance of $\omega_{d_{0-1}}$ and an output image impedance of $\omega_{C-1}^*$.

9. A filter as in claim 1 in which at least one four arm indivisible filter section has an attenuation of class $M_1M_2M_3$ and an input image impedance of $\omega_{d_1\infty}$ and an output image impedance of $\omega_{C1}^*$.

10. A filter as in claim 1 in which at least one four arm indivisible filter section has an attenuation of class $km_1m_2m_3$ and an input image impedance of $\omega_{d4-1}$ and an output image impedance of $\omega_{C0}^*$.

11. A filter as in claim 1 in which at least one four arm indivisible filter section has an attenuation of class $M_1M_2K$ and an input image impedance of $\omega_{d_1\infty}$ and an output image impedance of $$\omega_{b_{0_1}}*$$

12. A filter as in claim 1 in which at least one four arm indivisible filter section has an attenuation of class $kM_1M_2M_3M_4$ and an input image impedance of $\omega_{C1}^*$ and an output image impedance of $\omega_{C0}^*$.

13. A filter as in claim 1 in which at least one four arm indivisible filter section has an attenuation of class $KM_1M_2m_1$ and an input image impedance of $\omega_f$ and an output image impedance of $$\omega_{b_{0_1}}*$$

14. A filter as in claim 1 in which at least one four arm indivisible filter section has an attenuation class of $KM_1m_1m_2m_3$ and an input image impedance of $\omega_f$ and an output image impedance of $\omega_{C0}^*$.

References Cited by the Examiner
UNITED STATES PATENTS

| | | | |
|---|---|---|---|
| 1,227,113 | 5/1917 | Campbell | 333—70 |
| 1,434,555 | 11/1922 | Martin | 333—70 |
| 1,493,600 | 5/1924 | Campbell | 333—70 |
| 1,559,864 | 11/1925 | Fry | 333—70 |
| 1,644,004 | 10/1927 | Zobel | 333—70 |
| 1,708,950 | 4/1929 | Norton | 333—70 |
| 1,968,237 | 7/1934 | Wayers | 333—70 |
| 2,024,576 | 12/1935 | Grossman | 333—70 |
| 2,167,134 | 7/1939 | Wheeler | 333—70 |
| 2,209,100 | 7/1940 | Minton | 333—70 |

OTHER REFERENCES

Saal and Ulbrich: Design of Filters by Synthesis, IRE Trans. on Circuit Theory, December 1950, pages 284–327.

Cauer: "Synthesis of Linear Networks," published by McGraw-Hill, vol. 1, pages 768–772.

E. A. Guillemin: "Synthesis of Passive Networks," published by John Wiley and Sons, 1957, pages 241–43.

HERMAN KARL SAALBACH, *Primary Examiner.*

C. BARAFF, *Assistant Examiner.*